Oct. 20, 1942.         W. C. VIZARD              2,299,263
                 METHOD OF MAKING BEADED WELTING
                   Filed April 4, 1942      2 Sheets-Sheet 2
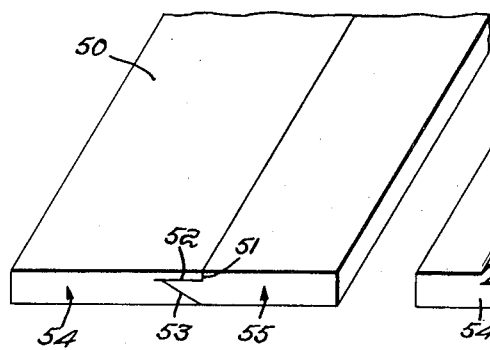
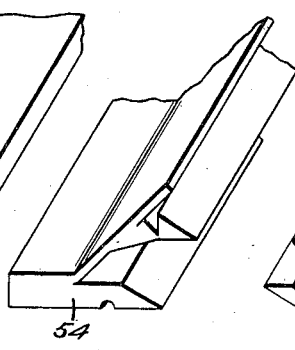
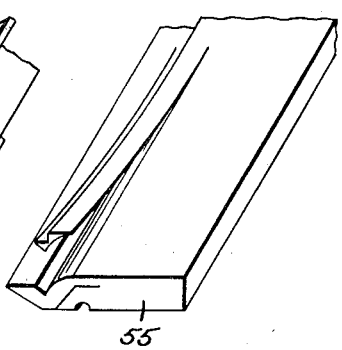
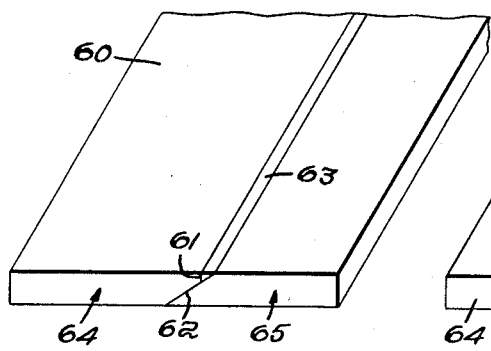
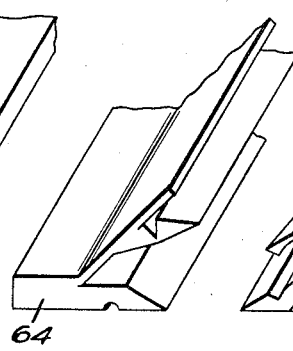
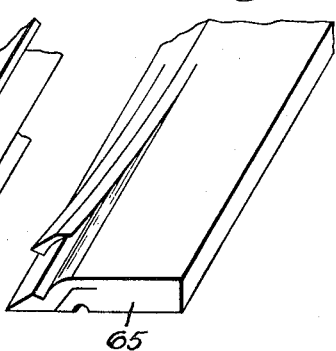
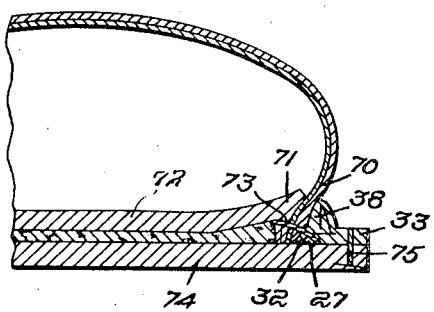
Inventor:
William C. Vizard,
by Thomson & Thomson
Attorneys Patented Oct. 20, 1942

2,299,263

UNITED STATES PATENT OFFICE 2,299,263

METHOD OF MAKING BEADED WELTING

William C. Vizard, Brockton, Mass., assignor to Barbour Welting Company, Brockton, Mass., a copartnership composed of Perley E. Barbour, Walter G. Barbour, and Richard H. Barbour Application April 4, 1942, Serial No. 437,649

6 Claims. (Cl. 12—146)

This invention relates to the manufacture of shoe welting, and pertains more particularly to improvements in methods of making beaded leather welting for high grade men's shoes. The principal purpose of the invention is to provide a beaded welt formed with a high, triangular-shaped bead which not only supports and closely hubs the shoe upper throughout the width of its inner face, but also affords a high, sloping outer face presenting a relatively wide, smooth surface that is uniquely pleasing in appearance and lends itself to attractive ornamentation through the application of any decorative design or pattern that the shoe manufacturer may desire to apply thereto.

The subject matter of this application is, in particular, an improvement on beaded welting of the type described in Arnold and Vizard Patent No. 1,828,728, which has been manufactured and sold for many years under the trade name "Stormwelt," and which is characterized by a relatively low, rounded bead formed by slitting the inner edge and base of a leather fillet to provide a core body which is folded beneath a cover strip and inseam lip to furnish a bead integral with the body of the welt. Such welting has proved very satisfactory in filling the welt crease of Goodyear welt shoes and thus strengthening the shoe and protecting the inseam from the weather, but the height of a bead formed in that fashion is necessarily limited by the width of the fillet used in the economical manufacture of a normal width welt, and its rounded top tends to fall away from the shoe upper and leave a slight gap or groove between the upper and the top of the bead.

In accordance with the present invention, the welt fillet is edge slit and bottom slit somewhat in the manner described in said Patent 1,828,728, and the flesh body of the resulting flap is then partially severed by a vertical cut which forms a hinged, wedge-shaped core flap as well as a core body; and the hinged flap is folded inwardly against an inclined inner face of the core body to provide a substantially triangular bead having a relatively sharp apex, wide, sloping sides, and a broad base. A beaded welt made in the improved manner presents an unusually high inner face which snugly hugs the shoe upper over the entire width of said face, thereby obviating any tendency of the pointed apex to spread or fall away from the upper and preventing the appearance of an unsightly and dirt-catching gap or crease between welt and upper.

These and other advantages of the new methods of manufacture, as hereinafter more fully explained, are achieved without appreciable increase in the cost of producing beaded welting of a width comparable to that made by the process disclosed in the aforesaid patent. It will be apparent, however, that the new welting is designed primarily for high grade and relatively expensive men's footwear in which sturdy construction combined with distinctive styling and well fitting qualities is expected and demanded.

Recommended embodiments of the invention are illustrated in the accompanying drawings, in which:

Figs. 7, 8 and 9 are perspective views of a double width fillet cut and severed longitudinally to form a fillet like that of Fig. 2 and a second fillet which is useful in making another type of beaded welting;

Figs. 10, 11 and 12 are views similar to Figs. 7, 8 and 9 respectively, showing a further modification in the method of producing a fillet like that of Fig. 5 and a second fillet useful for another purpose; and Fig. 13 is a fragmentary sectional view through the toe portion of a shoe made with the welt of Fig. 4.

Figure 1:
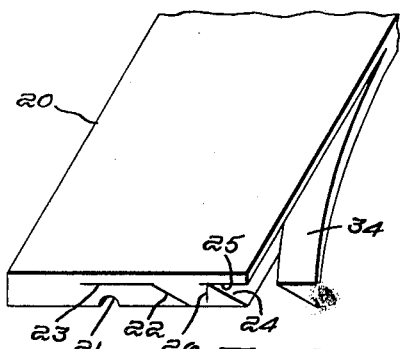
Fig. 1 is a perspective view of a leather fillet slit and cut in accordance with the improved method of manufacture.

In the particular embodiment chosen for the purpose of illustration in Figs. 1 to 4 inclusive, beaded welting approximately 5/8" wide and having a 1/4" welt extension and a bead nearly 1/4" high, is made from a grain leather fillet 20 (Fig. 1) 7/8" wide and 1/8" thick. The following incisions are made in the flesh body of the fillet, either simultaneously or in such order as may be desired; a longitudinal, rounded bottom groove 21 to receive the inseam stitch; an oblique slit 22 leading upwardly and outwardly (toward the outer or welt edge of the fillet at the left of the figures) from the flesh bottom of the fillet, said slit starting approximately 3/32" from the inner edge of the fillet and terminating 3/8" from said edge and approximately ³⁄₃₂" below the grain face of the fillet; a continuing cut 23 extending outwardly of the fillet parallel to the surface thereof for a distance slightly over ¼" (the intended height of the final bead) from the apex of slit 22; an oblique cut 24 extending upwardly from the inner bottom edge of the fillet, substantially parallel to slit 22, to a point approximately ³⁄₃₂" from the grain face; an edge cut 25 extending from the inner edge of the fillet, parallel to and about ³⁄₃₂" below said grain surface, to and slightly beyond the apex of cut 24; and a vertical slit 26 extending downwardly from the juncture of cuts 24 and 25 to a point ³⁄₃₂" above the bottom or flesh surface of the fillet.

It will be understood that these incisions are made longitudinally of the fillet and may be rapidly formed by appropriately shaped knives of suitable welt cutting machines designed for this purpose; and it will also be understood that the inseam groove 21 may be formed at this stage of the process or at some subsequent stage, as desired.

Figure 2:
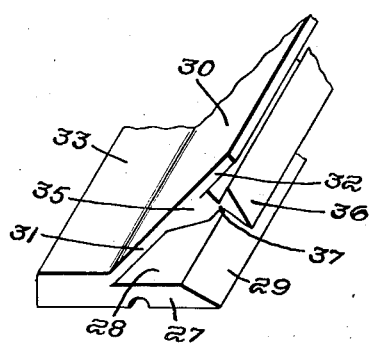
Figs. 2 and 3 are similar views showing successive stages of the folding operations.

The slits 22 and 23 are similar in general character and purpose to, but deeper than, the initial fillet cuttings of the aforesaid Patent 1,828,728. As shown in Fig. 2, these slits produce a flesh layer 27 having a level surface 28 and a beveled edge 29, and a grain flap 30 having a thin cover strip 31 and a thin marginal lip 32 of grain stock, and an underlying core of flesh stock; said flap being flexed upwardly with respect to the level welt extension 33. The cuts 24 and 25 free a wedge-shaped strip 34 (Fig. 1) which is removed from the fillet and may be used as a filler piece in the improved welting, as hereafter explained in connection with Fig. 6, or in other types of welting; and said cuts together with the slit 26 form a core body 35 and a wedge-shaped core flap 36 connected to the core body along the thin hinge 37 (Fig. 2).

Figure 3:
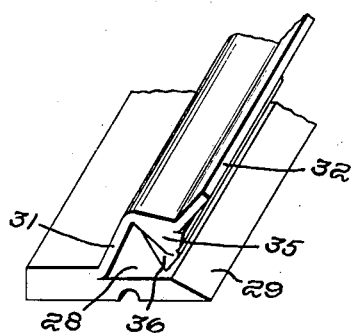
Figure 4:
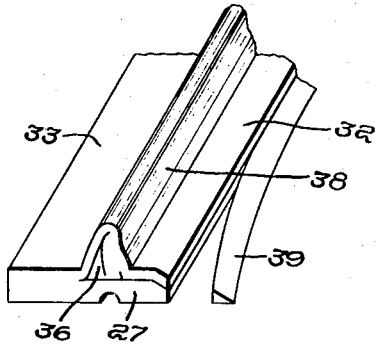
Fig. 4 is a perspective view illustrating a final edge trimming operation, and showing the finished welt.

To form the welt bead, the core flap 36 is folded downwardly and inwardly of the core body 35 and pressed and cemented to the inclined flesh face of the latter, as shown in Fig. 3; the thick, two-element core thus formed is bent downwardly and against the inner face of the cover strip 31 to which it is preferably cemented; and the base of said core and the under side of the grain lip 32 are pressed against and cemented to the surfaces 28 and 29 respectively of the flesh layer 27 along the inner side of the welt strip, as shown in Fig. 4. The resulting welt is molded under pressure to shape the bead 38 and compress the inseam edge thereof, and a string 39 is preferably severed from the inner edge of said flesh layer, either before or after the molding operation, to provide a square cut edge along the inseam margin (Fig. 4).

In the modification illustrated in Figs. 5 and 6, the fillet is formed with the inseam groove 21 and the cuts 22, 23, 25 and 26, as above described; but the wedge-shaped piece 44 is freed from the flesh base of the fillet along the inseam edge thereof by an oblique cut 45 extending downwardly and outwardly from said inner edge, the cut 45 starting approximately ³⁄₃₂" below the grain surface and terminating directly beneath the apex of cut 26 to form the thin hinge 37 which joints the core flap to the core body as previously explained.

Figure 5:
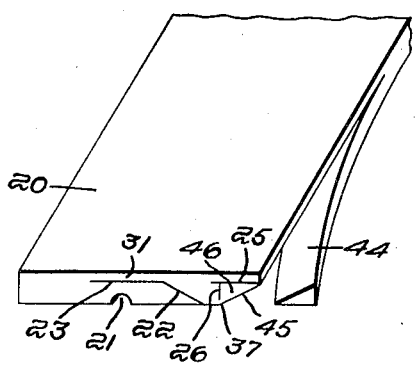
Fig. 5 is a view similar to Fig. 1, showing an optional method of cutting the fillet.

Although the core flap 46 of Fig. 5 differs slightly in shape from the flap 36 of Fig. 2, both flaps are characterized by a sharply pointed apex opposite the hinged base formed by slit 26, and each is foldable against its core body and beneath the cover strip 31 to form the two-element core of the triangular welt bead. In the bead 48 of Fig. 6, the removed flesh wedge 44 is inserted between the folded core flap 46 and the cover strip 31 to thicken the bead and broaden its base; but it will be appreciated that the use of the additional wedge is optional.

It will also be apparent that the width of the bead base may be varied by changing the direction and line of entrance of cut 22 or the angle of cuts 24 or 45, without affecting the height of the resulting bead or impairing the flatness of its sides or the relatively sharp angle at its apex.

Figure 6:
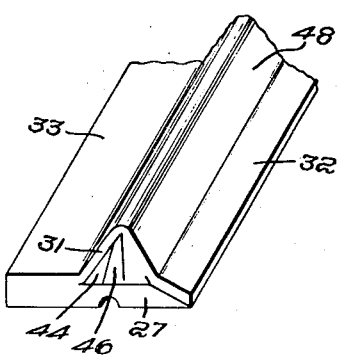
Fig. 6 is a perspective view of a beaded welt made from the fillet of Fig. 5, and also illustrating the optional inclusion of an additional filler piece in the body of the bead.

Figs. 7 to 12 show optional methods of so cutting a double width fillet as to provide a single fillet for producing the improved beaded welting of Figs. 4 and 6, respectively, and also another fillet suitable for use in making beaded welting of the type disclosed in my Patents Nos. 2,153,321 and 2,142,228, in which the inner side of the bead has a flesh face rather than a grain face as herein described. By forming two welt strands from a double fillet, substantial economies are afforded in the cost of the leather stock, for the width of the double fillet may be appreciably less than the combined width of separate strands required for producing the two welt strips; and any waste of leather resulting from the discarding of the removed wedges 34 and 44 (Figs. 1 and 5) is entirely eliminated.

The wide fillet 50 of Fig. 7, for example, is divided longitudinally by a short vertical cut 51 in the grain surface, a cut 52 slightly below and parallel to the grain surface, and an oblique cut 53 in the bottom or flesh side of the fillet, cuts 52 and 53 corresponding to the cuts 25 and 24 respectively of Fig. 1. Such division results in the separate strands or single fillets 54 and 55, as shown in Figs. 8 and 9 respectively, and the fillet of Fig. 8 is further cut and formed as previously described, to correspond with the partially formed welt strip of Fig. 2.

The strand of Fig. 9 is cut and scarfed to form a structure equivalent to that illustrated in Fig. 2 of my said Patent 2,153,321 or Fig. 3 of my Patent 2,142,228, but it will be understood that the present invention is not concerned with the completion of the welt made from strand 55.

Somewhat similarly, the wide fillet 60 of Fig. 10 is divided longitudinally by a short vertical cut 61 in the grain surface, and an oblique cut 62 which intersects the apex of cut 61 and extends to the flesh base of the fillet, thereby forming a removable grain string 63 and providing the separable strands 64 and 65. It will be observed that cut 62 corresponds to cut 45 of Fig. 5, and it will be understood that fillet 64 may be further cut as shown in that figure to produce a beaded welt like that of Fig. 6 but not necessarily including the additional wedge strip 44.

The strand of Fig. 12 is functionally equivalent to that of Fig. 9 and may be cut and scarfed to produce the welting described in my aforesaid Patents Nos. 2,153,321 and 2,142,228.

The beaded welting produced from the fillets of Figs. 2, 5, 8 or 11 is intended to be built into a shoe as indicated in Fig. 13, with the upstanding triangular bead 38 closely hugging the upper 70 and fitting well under the feather 71 of the usual channeled insole 72 of a welt shoe, when the sewing rib formed by the beveled edge of the flesh layer 27 and the grain lip 32 cemented thereto, is beaten in and tightly secured by the inseam stitch 73. The flat welt extension is sewed to the sole 74 by the customary outseam 75. As thus applied, the tall and broad based welt bead firmly supports the upper and holds the margin of the insole in place, and because of the abrupt, nearly vertical slope of the inner face of the bead and its relation to the insole feather, the snug engagement between bead and upper is maintained indefinitely during useful wearing of the shoe.

The more gradually sloping face on the outer or welt side of the bead presents a unique style effect and affords a broad and smooth surface which may be attractively designed or decorated to enhance the appearance of the shoe as a whole, as aforesaid.

I claim:

1. A method of making beaded welting having a grain surface on both sides of a triangular bead, which consists in making longitudinal incisions in the flesh portion of a grain leather fillet to produce a deformable bead portion having a thin cover strip a thin marginal lip of grain stock, and a depending core portion disposed between the cover strip and lip and comprising a core body and a triangular core flap hinged to said body, folding said flap inwardly of the bead portion and against said body, folding the assembled core beneath the cover strip to provide a solid upstanding bead, and pressing the grain lip onto the flesh base of the fillet to form a sewing edge.

2. A method of making beaded welting having a grain surface on both sides of an upstanding triangular bead, which consists in forming a grain flap extending along one side of a leather fillet by making an oblique cut upwardly from the flesh base thereof and a lateral cut parallel to the grain surface, thereby to provide a thin cover strip remote from the edge of the flap and a flesh base beneath said cover strip; forming a grain lip, a core body and a substantially triangular core flap hinged to said body by making lateral and oblique cuts in the edge of said grain flap and a vertical cut adjacent the apex of said lateral cut; folding the core flap inwardly of said flap and between the core body and cover strip to provide a substantially triangular bead portion; pressing said bead portion against said flesh base; and securing said grain lip to the edge of the flesh base.

3. A method of making beaded welting according to claim 2, in which the oblique cut at the edge of the grain flap extends upwardly from the bottom corner of the fillet to the intersection of the lateral and vertical cuts adjacent said edge.

4. A method of making beaded welting according to claim 2, in which the oblique cut at the edge of the grain flap extends downwardly from the entrance of the lateral cut at said edge to the bottom of the fillet adjacent the hinge of the core flap.

5. A method of making beaded welting according to claim 2, in which the folded core flap is cemented to the core body, cover strip and flesh base, and in which the grain lip is adhesively secured to the edge of said base.

6. A method of making beaded welting according to claim 2, in which the oblique cut at the edge of the grain flap is made in dividing the fillet from a leather strand substantially wider than said fillet.

WILLIAM C. VIZARD.